UNITED STATES PATENT OFFICE.

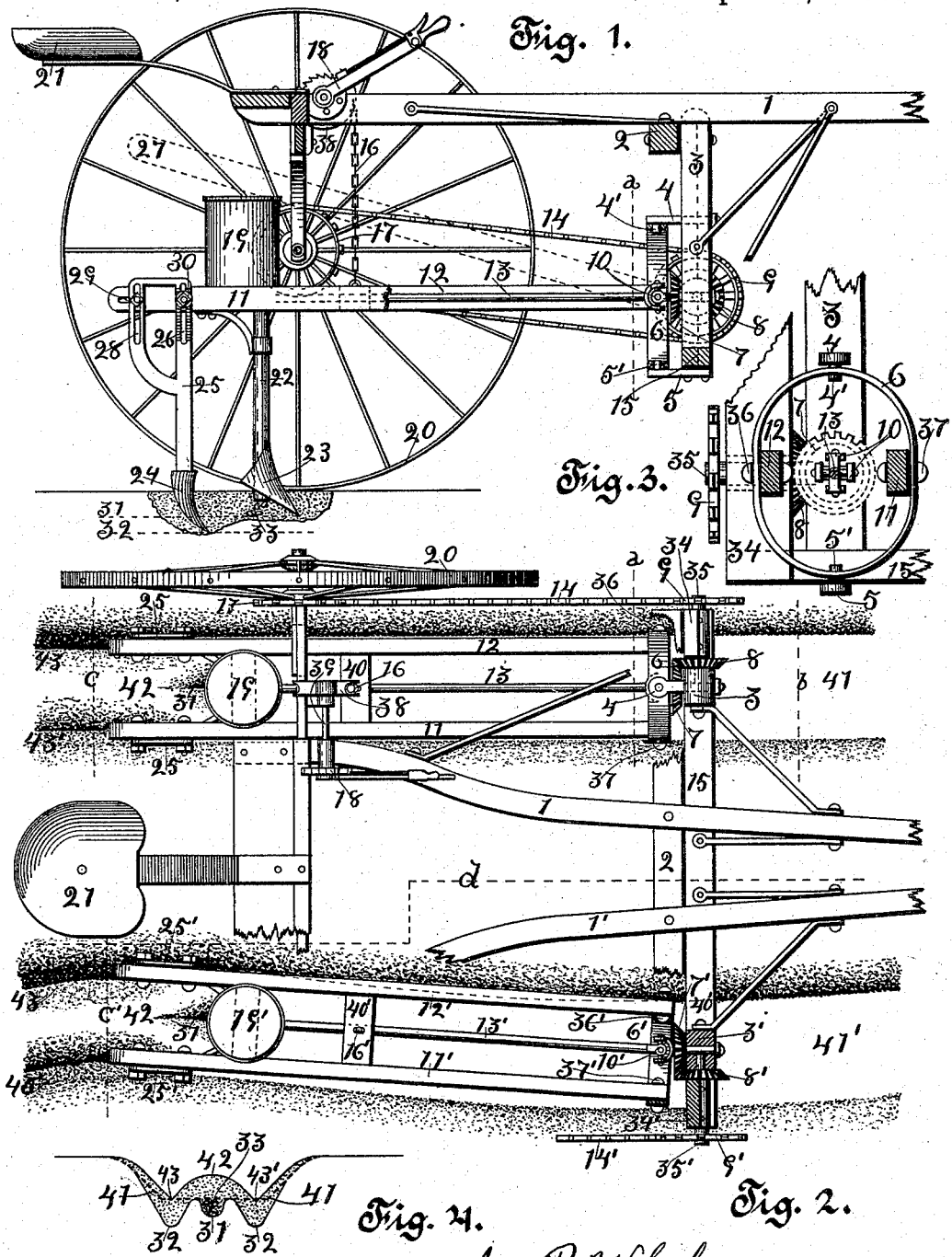

JOHN T. WHEELER, OF SHERIDAN PRECINCT, NEBRASKA.

DOUBLE LISTER CORN-DRILL.

SPECIFICATION forming part of Letters Patent No. 537,875, dated April 23, 1895.

Application filed June 30, 1894. Serial No. 516,196. (No model.)

*To all whom it may concern:*

Be it known that I, JOHN T. WHEELER, a citizen of the United States, and a resident of Sheridan Precinct, in the county of Washington and State of Nebraska, have invented a new and useful Double Lister Corn-Drill and Method of Drilling and Planting on Listed Ground, of which the following is a specification.

My invention relates to improvements in seed drills for planting or drilling seed on furrowed or listed ground. The objects are, first, a method of placing the seeds in such furrows to insure the germination and easy cultivation of same, and prevent the seeds being washed or drowned out by heavy rains; second, to provide a double drill that will automatically adjust itself to the varying distances between the furrows; third, to operate a seed dropping device in connection therewith that will permit lateral and vertical vibration of the beams carrying the drills and be positive and regular in its action; and, fourth, to drive the drops by large wheels carrying a main frame with pole and seat, all independent of the drills, except at the points of draft, at fore ends of beams, and a flexible raising and depth adjusting device for the drills. I attain these objects in the manner and by the mechanism illustrated in the accompanying drawings, in which—

Figure 1 is a vertical section on the broken line *d* of Fig. 2. Fig. 2 is a top or plan view with one of the main drive and carriage wheels removed, and portions of the frame cut away to bring important parts in view. Fig. 3, is an enlarged detail vertical section on the broken line *a* of Figs. 1 and 2 looking forward; and Fig. 4 is a vertical cross-section of the furrows and soil on the broken lines *b*, *c* and *C'*, in Fig. 2, looking forward.

Similar numerals refer to similar parts throughout the several views.

The ground is first prepared for listing corn, by being furrowed with a special double moldboard plow making single trenches, 41 and 41' of Fig. 2, in cross section about the form indicated by the broken line 41 of Fig. 4. As these furrows or trenches are each made by a separate operation and single implement, the distances between them vary so much that it has seemed heretofore to be impractical to construct a drill that would plant two rows at a time, for each drill could not correctly follow its trench or furrow.

To an ordinary arched axle frame or draft carriage such as are used to carry disk corn cultivators, a downward projecting framework consisting of uprights 3 and 3', and 34 and 34' with horizontals or cross-bars 2 and 15, is attached beneath the pole 1, forward the wheels 20. At one end of the said framework the horizontal shaft 35 ranged at right angles to the path of the machine is journaled in the uprights 3 and 34 and carries at its outer end the sprocket wheel 9 which is revolved by the drive chain 14 connected with a like sprocket wheel 17 on the carriage and drive wheel 20. This shaft 35 also carries the bevel gear wheel 8 engaging the bevel gear wheel 7, near the forward end and attached to the shaft 13 which is disposed thence rearwardly, to the seed hopper 19, to actuate the drop, and journaled centrally between the pair of beams 11 and 12 which carry the hopper and shovels 23 and 24. This shaft 13 is provided, at a point just back of the bevel gear wheel 7 with a universal joint, the portion of the shaft forward the joint carrying the bevel gear wheel being journaled stationarily in the frame, while the part to the rear of the joint is free to vibrate in any direction with the beams.

Directly above and below the universal joint and projecting from the frame supporting the shafts and gear wheels are the arms 4 and 5. To these arms is pivoted the ring or yoke 6 to revolve or oscillate in a horizontal plane on the pivots 4' and 5' the axes of which and the axial line of revolution on oscillation of the yoke, pass directly through the axis and center of the universal joint in the shaft 13. The forward ends of the beams 11 and 12 are pivoted to opposite sides of the yoke so that the beams may oscillate vertically, on the pivotal pins 36 and 37 the axes of which agree with the center of the universal joint thereby bringing the points of flexure in the shaft and beams exactly concentric, and allowing the drill to rise and fall with the unevenness of the ground, or move laterally to follow the deviating course of the furrows as indicated by the opposite side of the machine in the furrow 41' in Fig. 2.

The opposite sides or drills are alike in construction and as shown each is driven separately.

The shaft 39 is journaled on top of the carriage and carries a grooved sector pulley 38 to receive the chain 16 connected with the beams, also a spring pawl, ratchet and lever 18, within easy reach from the seat 21, by means of which the depth of cut of the shovels is adjusted, or the beams drawn up to the position indicated by the broken line 27 in Fig. 1, for travel.

A device not shown nor forming a part of this invention may be used to throw the drop out of gear when the beams are raised for travel or turning or when one drill only is used in finishing a field.

In Fig. 4, the lower line showing the depressions 32 and 32 with a lesser depression or furrow 31 disposed centrally between them indicates the line of cut of the side shovels or coverers 24 and of the drill shovel 23, while the upper line showing the ridge 42—directly above the furrow or seed bed 31—and the valleys 43 and 43' directly above the side furrows 32 closely approximates the surface of the soil as left by the shovels; and the mottled field disposed between these upper and lower lines is a cross section of the soil moved by the shovels in the operation of depositing and covering the seed. The broken line 41 shows the form of the trench or furrow before it is entered by the drill.

A hollow standard 22 of fixed length carries the drill shovel 23, and conducts the seeds 33 from the hopper to the furrow or bed 31 formed by the shovel. This standard for convenience is disposed beneath the hopper and centrally with reference to the beams. Behind this on each beam is attached a standard 25 carrying the covering shovels 24, the upper end of standard bolted to beam through a vertical slot 26 in the standard, so that depth of cut can be adjusted with reference to the drill. A slotted brace 28 on the standard bolted through a horizontal slot 29 in beam as shown facilitates adjusting the pitch of the shovels. These standards may be shifted to the inside of opposite beam to narrow the distance between the covering shovels.

The drill shovel which cuts the seed-bed 31, follows the center of the listing furrow 41 and need not cut so deep but that the seed 33 will be left in sight and seen by the driver from his seat, before it is covered by the coverers, thereby being sure that the drop is working right.

As the seed 33 is deposited in a subcut bed 31, between two subcuts 32, 32, of greater depth directly under the valleys 43 and 43', each side of the seed covering 42, the water will wash out the loose soil in the valleys 43 and 43' down to the bottom of the subcuts below, leaving the seed bed unharmed on a ridge between; thus preserving the crop until the subcuts are refilled by subsequent cultivation; and while the seed-bed is of sufficient depth to be protected against drouth the subcuts of greater depth each side are a protection against drowning out in a wet season, serving as drains. The same method of planting may be used advantageously on ground not listed or furrowed.

By a slight modification a single beam may be used instead of a pair as set forth; the principal requirement being that the universal joints in beam and shaft driving the drop shall be concentric.

I do not wish to be confined to the specific construction of wooden frame set forth in the drawings, as a modification in iron or steel may be advantageously substituted.

By driving the drop from the large carriage wheels I avoid much of the unevenness of feed caused by small wheels over rough uneven ground, and this, with the advantage of doubling the capacity, and providing a riding lister drill are among the many advantages in my contrivance not previously mentioned.

Having fully described my invention, what I claim as new, and desire to secure by Letters Patent, is—

1. A double lister drill consisting of a pair of separate drills attached to one carriage frame by universal joints consisting of rings pivoted to the frame and to the drill beams, seed-drops carried by the beams and actuated by shafts connected to the carriage wheels, said shafts disposed through said rings and having universal joints concentric with the pivots connecting the rings to the beams and frame, substantially as described.

2. In a lister drill a ring pivoted to a draft frame, a seed drop carried by a drill-beam pivoted to the ring, the seed drop connected to a drive wheel by a shaft disposed through the ring and having a universal joint concentric with the pivots connecting the ring with the beam and frame substantially as described.

3. In a lister drill the combination of a beam carrying a seed drilling apparatus, and attached to a draft carriage by a universal joint, with a shaft connected to the carriage wheel to drive the seed drop, and having a universal joint concentric with the universal joint of the beam substantially as described.

4. In a lister drill, the combination of a draft carriage, a beam attached to the frame of the carriage by a universal joint and carrying a seed drilling apparatus, a shaft on the frame connected to the carriage wheel and geared to a shaft having a universal joint concentric with the universal joint of the beam, to drive the seed drop of the drill, substantially as described.

Signed at Vacoma, in the county of Washington and State of Nebraska, this 25th day of June, 1894.

JOHN T. WHEELER.

Witnesses:
ARCHIBALD M. BOVEE,
WILLIAM T. GRANT.